US011236730B2

(12) United States Patent
Rogg

(10) Patent No.: US 11,236,730 B2
(45) Date of Patent: Feb. 1, 2022

(54) METHODS AND DEVICES FOR ACCESSING A DRIVE TRAIN OF A WIND TURBINE WITH ELASTIC COUPLING, WIND TURBINE AND METHODS

(71) Applicant: Adwen GmbH, Bremerhaven (DE)

(72) Inventor: Andreas Rogg, Hamburg (DE)

(73) Assignee: ADWEN GMBH

( * ) Notice: Subject to any disclaimer, the term of this patent is extended or adjusted under 35 U.S.C. 154(b) by 495 days.

(21) Appl. No.: 15/775,953

(22) PCT Filed: Nov. 15, 2016

(86) PCT No.: PCT/EP2016/077729
§ 371 (c)(1),
(2) Date: May 14, 2018

(87) PCT Pub. No.: WO2017/081331
PCT Pub. Date: May 18, 2017

(65) Prior Publication Data
US 2018/0328345 A1  Nov. 15, 2018

(30) Foreign Application Priority Data
Nov. 15, 2015  (EP) .................................... 15194638

(51) Int. Cl.
*F16D 15/00*     (2006.01)
*F03D 15/00*     (2016.01)
(Continued)

(52) U.S. Cl.
CPC ............... *F03D 15/00* (2016.05); *F16D 3/58* (2013.01); *F16D 3/80* (2013.01); *F16D 66/00* (2013.01);
(Continued)

(58) Field of Classification Search
CPC ............ F03D 15/00; F03D 80/00; F16D 3/58; F16D 3/80; F16D 66/00; F16D 2066/003;
(Continued)

(56) References Cited

U.S. PATENT DOCUMENTS 1,789,862 A * 1/1931 Bricken .................. E21B 44/04
                                                           464/23
4,714,917 A * 12/1987 Counter .................... F16D 3/50
                                                           464/23

(Continued)

FOREIGN PATENT DOCUMENTS

| EP | 2846039 A1 | 3/2015 |
|----|------------|--------|
| WO | 2012052022 A1 | 4/2012 |
| WO | 2015071689 A1 | 5/2015 |

OTHER PUBLICATIONS

International Preliminary Report on Patentability for International Application No. PCT/EP2016/077729 dated May 24, 2018.
(Continued)

Primary Examiner — Greg Binda
(74) Attorney, Agent, or Firm — Schmeiser, Olsen & Watts LLP

(57) ABSTRACT

Methods and devices for monitoring a drive train for a wind turbine utilize an elastic coupling. The drive train comprises a rotor shaft configured to be driven by a rotor about a main axis, a support structure including a bearing housing surrounding at least one bearing and supporting the rotor shaft for rotation about the main axis to constrain other movements of the rotor shaft. A gearbox input shaft and housing supports the gearbox input shaft for rotation while constraining other movements of the gearbox input shaft. The gearbox input shaft is coupled to the rotor shaft by an elastic coupling that includes a first coupling part rigidly connected with the rotor shaft, a second coupling part rigidly connected with the gearbox input shaft, and elastic elements positioned (Continued)

between the first and the second coupling part to provide a single joint between the rotor shaft and the gearbox input shaft.

9 Claims, 16 Drawing Sheets

(51) Int. Cl.
*F16D 3/58* (2006.01)
*F16D 3/80* (2006.01)
*F16D 66/00* (2006.01)

(52) U.S. Cl.
CPC .... *F05B 2260/50* (2013.01); *F16D 2066/003* (2013.01); *F16D 2300/18* (2013.01); *Y02E 10/72* (2013.01); *Y10T 464/20* (2015.01)

(58) Field of Classification Search
CPC ............... F16D 2300/18; Y10T 464/20; Y02E 10/72; F05B 2260/50; Y02P 70/50
USPC ............................... 700/287; 290/55; 464/23
See application file for complete search history.

(56) References Cited

U.S. PATENT DOCUMENTS

| | | | |
|---|---|---|---|
| 8,485,048 B2* | 7/2013 | Bushey | G01M 13/027 |
| 8,688,281 B2* | 4/2014 | Viassolo | F03D 9/257 |
| | | | 700/287 |
| 10,550,827 B2* | 2/2020 | Rogg | F03D 15/00 |
| 10,683,848 B2* | 6/2020 | Rogg | F03D 80/70 |
| 2009/0301224 A1 | 12/2009 | Sihler et al. | |
| 2011/0142622 A1 | 6/2011 | Hoffmann et al. | |
| 2015/0139715 A1 | 5/2015 | Exner et al. | |

OTHER PUBLICATIONS

International Search Report and Written Opinion for PCT Application No. PCT/EP2016/077729, dated Jan. 26, 2017.

* cited by examiner

METHODS AND DEVICES FOR ACCESSING A DRIVE TRAIN OF A WIND TURBINE WITH ELASTIC COUPLING, WIND TURBINE AND METHODS

CROSS REFERENCE TO RELATED APPLICATIONS

This application is a United States National Phase application of PCT Application No. PCT/EP2016/077729 mailed Nov. 15, 2016, claiming priority to EP 15 194 638.1, filed Nov. 15, 2015.

FIELD OF INVENTION

The present invention relates to device and methods for accessing a drive train for wind turbines, wind turbines and methods of manufacturing or retrofitting wind turbines.

BACKGROUND

Wind turbines or wind power plants comprise a drive train, which extends from the rotor or rotor hub to the generator. The drive train can comprise a hub, a rotor shaft (or main shaft) a gearbox input shaft, a gearbox and a generator. The drive train is mainly configured to transfer torque from the rotor to the generator. However, there are also other rotor loads different than the mere torque load. These other loads should be transferred to and eliminated by the nacelle structure. The load path of these other loads through the drive train to the nacelle structure depends on the particular arrangement and on variations and magnitudes of these loads, the machining tolerances, load deformations, thermal effects and other conditions. All this may result in undesirable parasitic forces that have the potential to damage elements in the drive train, particularly the gearbox components and the main bearings Eliminating these parasitic forces is inseparably connected with gearbox and bearing reliability.

WO 2012/052022 A1 discloses a drive train for a wind turbine comprising a main shaft and a gearbox with a gearbox input shaft driven by the main shaft. There are two couplings located between the main shaft and the gearbox input member of the gearbox. The two couplings are configured such that the transmission of undesired loads is reduced.

WO 2013/007322 A1 discloses a drive train comprising a rotor shaft and a generator input shaft which are coupled with each other via a coupling having elastic elements. It is disclosed that the coupling comprises two coupling parts which are rigidly connected with the rotor shaft and the generator shaft. However, the elastic elements provided between the coupling parts have chambers filled with a fluid, in particular a hydraulic fluid and they are arranged in pairs.

One of the main drawbacks of an elastic coupling is the potential wear or generally a change of the properties of the elastic coupling during operation.

SUMMARY

It is an object of the present invention to provide a method for monitoring a drive train for a wind turbine and a drive train that overcomes the drawbacks of the prior art.

According to a first aspect, a method of monitoring a condition of an elastic coupling of a drive train is provided. The method generally comprises the step of determining a condition of the elastic coupling. It can further comprise outputting a signal indicating the condition.

The method may further comprise the steps of: evaluating sensor output signals from at least one out of an axial sensor device, a radial sensor device, a tangential sensor device and a rotational sensor device each of which is comprised in the elastic coupling and adapting a property of an elastic element of the elastic coupling in accordance with the sensor output signals.

The drive train and in particular the elastic coupling can be configured as follows.

According to an aspect of the invention, a drive train for a wind turbine is provided. The drive train comprises a rotor shaft (main shaft) configured to be driven by a rotor about a main axis, a support structure including a bearing housing surrounding at least one bearing and supporting the rotor shaft for rotation about the main axis, thereby constraining other movements of the rotor shaft. The drive train further comprises a gearbox input shaft and a gearbox housing supporting the gearbox input shaft for rotation about the main axis while constraining other movements of the gearbox input shaft. Still further, the drive train comprises an elastic coupling. The gearbox input shaft is coupled to the rotor shaft the elastic coupling. The elastic coupling comprises a first coupling part rigidly connected with the rotor shaft, a second coupling part rigidly connected with the gearbox input shaft, and elastic elements positioned between the first coupling part and the second coupling part, thereby constituting a single joint between the rotor shaft and the gearbox input shaft. This aspect provides that a single elastic coupling in the form of a single joint provides sufficient degrees of freedom for any movement other than in the main load torque directions.

According to an aspect, the elastic coupling can comprise at least one sensor device that monitors a condition of the elastic coupling. The signals acquired by the sensor device can be further processed in the sensor device, i.e. in a sensor signal processing unit, and/or in a separate and/or dedicated control logic, and/or in a (central) programmable control logic of the wind turbine.

A sensor device according to the aspects and embodiments can advantageously comprise two parts: a sensor unit and a sensor target. Using two part sensor devices can be advantageous as there are rotating parts and static parts in the drive train of a wind turbine. The sensor unit can be active (configured to acquire and/or process signals, requiring electrical energy) while the sensor target can be passive (no electrical energy required). However, also the sensor target can be active under certain circumstances.

In an aspect, the elastic coupling (including the coupling housing) can comprise a rotational sensor device. The rotational sensor device can comprise a rotational sensor unit and a rotational sensor target. The first coupling part and the second coupling part of the elastic coupling may then each comprise a rotational sensor target. Each rotational sensor target can be attached to the respective circumference of the respective coupling part for determining a relative rotational speed and/or a phase shift and/or a load torque. In an embodiment, the sensor target can be of an optical type, a magnetic type and/or physically marked (for example toothed). One or more rotational sensor units (for example configured as an encoder) corresponding to the rotational sensor targets can be arranged in the coupling housing. One sensor unit may be provided for the sensor target coupled/attached to the first coupling part (connected with the rotor shaft), and another sensor unit may be provided for the sensor target coupled/attached to the second coupling part (connected with the gearbox input shaft).

Furthermore, a rotational sensor signal processing unit may be provided. The sensor signal processing unit may be configured to determine and/or process a phase shift between the rotational position of the rotor shaft and the rotational position of the gearbox input shaft based on the output of the speed sensor unit.

In an aspect, a control logic can be provided which is configured to determine a torque transferred by the elastic coupling based on stiffness properties of the (combined) elastic elements of the elastic coupling and the phase shift. This aspect can be advantageous if the central programmable control logic (PLC) is not configured to perform the required signal processing or should not be adapted.

In an embodiment, the control logic can be further configured to determine whether stiffness properties of the elastic elements are in a required range based on (a) the phase shift and (b) a transmitted torque signal provided by a programmable logic controller (PLC) of a wind turbine representing the transmitted torque.

In an embodiment, the sensor target on the first coupling part and/or second coupling part of the elastic coupling can be a closed ring along the circumference. In another embodiment, the sensor target on the first coupling part and/or second coupling part of the elastic coupling can be discontinuous along the circumference.

The sensor signal processing unit can be configured to determine the rotational speed of the rotor shaft and/or the gearbox input shaft and to provide the signal to the turbine PLC.

The drive train, in particular the elastic coupling can comprise one or more proximity and/or distance sensors which are configured, for example to determine the gap between the coupling housing and the first and second coupling part and take the signal into account for the coupling condition monitoring and/or generating the phase shift signal.

The elastic coupling can further comprise a radial sensor device.

The elastic coupling can further comprise an axial sensor device.

The elastic coupling can further comprise a tangential sensor device.

The terms "radial", "axial" and "tangential" are defined as follows: "Axial" relates to the direction of the main axis of the drive train, i.e. the longitudinal axis of the rotor shaft and the gearbox input shaft etc. "Radial" relates to a direction that is oriented radial to the axial direction as previously described. "Tangential" relates to the direction that is tangential to the axial direction as previously described. In other words, the tangential direction is the circumferential direction around the main axis.

In an advantageous aspect, the elastic coupling may comprise all the described sensor devices.

The radial sensor device can be configured to determine a distance between the first coupling part and the second coupling part in the radial direction.

The axial sensor device can be configured to determine a distance between the first coupling part and the second coupling part in the axial direction.

The tangential sensor device can be configured to determine a displacement and/or distance between the first coupling part and the second coupling part in the tangential direction. This can for example be the extension/length of an elastic element along a dominant axis of stiffness of the elastic element and between the first coupling part and the second coupling part in the tangential/circumferential direction.

The values, displacements, distances etc. determined/detected by the sensor devices can generally and advantageously be used to determine a condition of the elastic coupling. The values, displacements, distances etc. determined/detected by the sensor devices can be used in order to adapt or change the properties of the elastic coupling, in particular the properties of the elastic elements of the elastic coupling. Such a property can be the stiffness of the elastic elements in a specific direction, for example the dominant direction of stiffness or any other direction (as described below). The adaption/maintenance/exchange of the elastic coupling is advantageously be done in response to output signals provided by at least one or all of the sensor devices. The adaption/maintenance/exchange of the elastic elements may be performed automatically. An automatic adaption/maintenance may be performed by adapting a pressure in a hydraulic circuit to which one or more of the elastic elements are coupled (details of hydraulic coupling are described herein below).

At least one or all of the elastic elements can be configured and/or arranged such that a force-deformation behavior of the elastic element(s) is different in a first load direction than in a second load direction or any other load direction other than the first load direction.

At least one or all of the elastic elements can be configured and/or arranged such that at least one or all of the elastic element(s) have a first stiffness in a first load direction (dominant direction of stiffness) and a second stiffness in a second load direction. The first stiffness is advantageously greater than the second stiffness. The first stiffness can be greater than any stiffness of the elastic element in other load directions (other than the dominant direction of stiffness). The elastic element advantageously provides the first stiffness in the main load torque directions. In the context of this specification, a torque or load torque or load torque direction is represented and described by the rotational direction instead of the vector representation, as the referral to the rotational directions is considered more intuitive.

At least one or all of the elastic elements can comprise or be made of rubber, polymer, elastic material or combinations of rubber and/or polymer and/or elastic material and/or stiff components. At least one or all of the elastic elements can be configured or be made in form of springs, helical springs, and/or coil springs. At least one or all of the elastic elements can have the form of pads, cylinders, or cubicles.

Advantageously, at least one or all of the elastic elements can have one dominant axis or dominant dimension or dominant direction in which the stiffness is higher than in any other dimension or axis of the elastic element. The main load direction (main load torque direction) of the drive train advantageously coincides with the dominant axis or dominant dimension or dominant direction of greatest stiffness of the elastic elements. The axis or dimension of the greatest stiffness of the elastic elements advantageously corresponds to a direction of compression of the elastic element.

The elastic coupling can be configured to allow a relative rotation between the first and the second coupling part around axes perpendicular to the main axis, a translation along the main axis as well as a translation in the axes perpendicular to the main axis more easily than a relative rotation of the first coupling part and the second coupling part with respect to each other in the load torque direction around the main axis. In other words, the elastic elements in the elastic coupling, in particular the stiffness of the elastic elements, are configured such that the elastic coupling allows the above movements more easily than any relative movement of the two coupling parts in the torque load direction (s)

The elastic elements can be arranged and configured such that the elastic elements provide different stiffness characteristics per load direction. The transfer of the torque can be performed with a first stiffness (in the dominant direction of stiffness). The elastic elements can be configured to provide a second stiffness with respect to movements in transverse degrees of freedom and rotational degrees of freedom except for a rotation around the longitudinal direction of the main axis. This allows the first coupling part and the second coupling part to be offset and deflected with respect to each other without generating significant reaction forces.

In an advantageous aspect, only a single elastic element is used for a first, positive load torque direction (i.e. in a first direction of rotation) and a second, negative load torque direction (i.e. in a second direction of rotation, opposite to first direction of rotation). The first load torque direction is opposite to the second load torque direction.

In an embodiment using a single elastic element for both torque directions, each elastic element can be arranged such that (congruent) attachment, abutment or pushing surfaces of the first coupling part and the second coupling part are at each side of the elastic element such that the elastic element can be loaded in a positive torque direction as well as in a negative torque direction. In particular, the elastic elements and the first and second coupling part are configured such that the elastic elements are compressed along their dominant direction and/or dominant axis of stiffness in the first load torque direction and in an opposite, second load torque direction. This aspect reduces the number of required elastic elements, simplifies manufacturing and maintenance and reduces costs.

Accordingly, in an aspect, only a single elastic element for two opposite torque load directions is used. All the elastic elements of the elastic coupling can be used for the two opposite torque loads. The first coupling part can provide at least a first attachment (or abutment, or pushing) surface and an opposite second attachment (or abutment or pushing) surface. The second coupling part can then also provide at least a first attachment (or abutment or pushing) surface and an opposite second attachment (or abutment or pushing) surface.

One attachment (or abutment) surface of each of the two coupling parts can be in contact with a same first side of an elastic element and one attachment (or abutment) surface of each of the first and the second coupling part can be in contact with a same second side of the elastic element. The second side of the elastic element is opposite to the first side of the elastic element. The attachment (or abutment) surfaces of the first and the second coupling part being in contact with the same side of the elastic element can be referred to as "congruent". In an embodiment, the abutments surfaces can be provided by superposed or coinciding windows in the coupling parts. However, there are various different possible configurations. One minimum requirement is that each of the two opposite sides of the elastic element should at least be arranged to be pushed (or abut against) an abutment or attachment or contact surface of both, the first and the second coupling part. The elastic elements can be located on congruent attachment/abutment surfaces of the first and the second coupling part such that a single elastic element can be loaded in a positive torque direction as well as in a the negative torque direction. The respective surfaces of the two coupling parts on one side of the elastic element can be arranged side by side and adjacent to each other. It is also possible that the two surfaces are provided by different coupling parts and that the surface of one coupling part is arranged behind a shoulder or extension of the respective other coupling part. However, the last embodiment can advantageous for embodiments not requiring pre-stressed elastic elements.

The previously described aspects provide that a single elastic element can be used for two opposite load torque directions, i.e. the positive torque direction and the negative torque direction. The elastic element is than only compressed or squeezed along the dominant axis or direction of stiffness regardless of the load torque direction. The number of required elastic elements EM can then be reduced to half the number of embodiments using pairs of modules.

In an aspect, if the elastic elements use a chamber for fluid for adjusting the stiffness of the elastic elements, all the elastic elements can be hydraulically coupled with each other. It is not necessary to separate the hydraulic connection into one system for positive load torque and one system for negative load torque.

In an aspect, pairs of elastic elements can be located between respective opposite attachment surfaces of the first coupling part and the second coupling part such that a first element of each pair is loaded in a first/positive torque direction and a second element of each pair is loaded in a second/negative torque direction. The second torque direction is opposite to the first torque direction. More specifically, the elastic elements can be arranged in pairs of two adjacent elastic elements along a circumference of the elastic coupling between abutment surfaces of the same coupling part, such that the pairs of the elastic elements can be located between respective opposite attachment surfaces of the first coupling part or the second coupling part such that a first element of each pair is loaded in a first/positive torque direction and a second element of each pair is loaded in a second/negative torque direction, wherein the second torque direction is opposite to the first torque direction.

In an aspect, the rotor shaft and the gearbox input shaft can be mounted/assembled with a preset eccentricity of their longitudinal main axes, such that a longitudinal axis of the rotor shaft and a longitudinal axis of the gearbox input shaft are initially mounted eccentrically to each other in order to minimize any eccentricity or offset resulting from weight and/or loads and/or torque during operation. The relevant torque could be the normal expected torque during operation of the wind turbine. In order to achieve the preset eccentricity the center point of the bearing housing may be slightly shifted. The center point of the bearing housing may be shifted vertically. This has an influence on the bending line such that in total undesired eccentricities are compensated by the preset eccentricity during mounting and assembly of the wind turbine/train drain.

Regarding the previously described aspect, it is normally most advantageous that the rotor shaft and the gearbox input shaft of a drive train of a wind turbine are perfectly aligned and centered with respect to each other. Otherwise, any coupling and in particular an elastic coupling, specifically the elastic elements, as described herein, will be constantly agitated during each rotation. This can substantially increase the wear of the elastic elements. According to this aspect, the rotor shaft and the gearbox input shaft are arranged with respect to each other with a slight eccentricity in order to compensate any other effects that introduce an opposite eccentricity. If for example the coupling housing, the gearbox housing and the generator are all freely suspended from the bearing housing, this can introduce a slight eccentricity between the rotor shaft and the gearbox input shaft which results in an eccentricity in the elastic coupling, in particular an eccentricity of the first coupling part with respect to the second coupling part. This and any other eccentricity can then be compensated by the suspension of the bearing housing, in particular the suspension of the main bearing in the bearing housing. The bearing housing may be coupled to the main frame of the nacelle. The ring flange between the bearing housing and coupling housing can be used to create the eccentricity between the rotor shaft and the gearbox input shaft. The eccentricity can also or in combination be created by the coupling (flange) the coupling housing and the gearbox housing. An advantageous direction is an eccentricity in a vertical direction. It is also possible to create the eccentricity in any other directions, as for example the horizontal direction. The eccentricity is advantageously in the range of less than 1 mm. The eccentricity provides that during each rotation the elastic elements are not agitated. Since the gearbox (housing) and the generator (housing) are suspended from the bearing housing, the weight of these components can introduce an eccentricity that is to be compensated by a predetermined and preset eccentricity in the opposite direction. Accordingly, and expected or determined eccentricity can be can be compensated by a slight preset eccentricity introduced by a shift of the bearing housing.

The elastic elements can generally be positioned circumferentially and in a tangential direction between (for example respective abutment, attachment, or pushing surfaces of) the first coupling part and the second coupling part of the elastic coupling and the first coupling part and the second coupling can provide attachment, abutment and/or pushing surfaces for opposite ends of each of the elastic elements.

At least one or all of the elastic elements can be pre-stressed (squeezed, compressed) in a non-loaded condition in order to increase the stiffness in a specific load direction. In particular, the torsional stiffness can be increased by pre-stressing the elastic elements. The stiffness is advantageously increased in the main load torque direction which can then correspond to the dominant axis and/or the dominant direction of stiffness of the elastic elements.

At least one of the elastic elements can contain a chamber configured to be filled with a fluid. Advantageously, a plurality of the elastic elements can contain a chamber configured to be filled with a fluid. The chambers can be hydraulically connected with each other.

The chambers of all elastic elements acting in the positive torque direction can be hydraulically coupled with each other and the chambers of all the elastic elements acting in the negative torque direction can be hydraulically coupled with each other.

The invention also provides a wind turbine comprising the drive train according to the aspects and embodiments of the invention. The invention further provides a wind park comprising a wind turbine comprising a drive train according to the aspects and embodiments of the invention.

The invention also provides a method for manufacturing and/or for retrofitting a wind turbine comprising a drive train according to the aspects and embodiments of the invention.

BRIEF DESCRIPTION OF DRAWINGS

Further features and advantages of the invention will ensue from the following description with reference to the accompanying drawings, wherein.

DETAILED DESCRIPTION OF EMBODIMENTS

Figure 1:
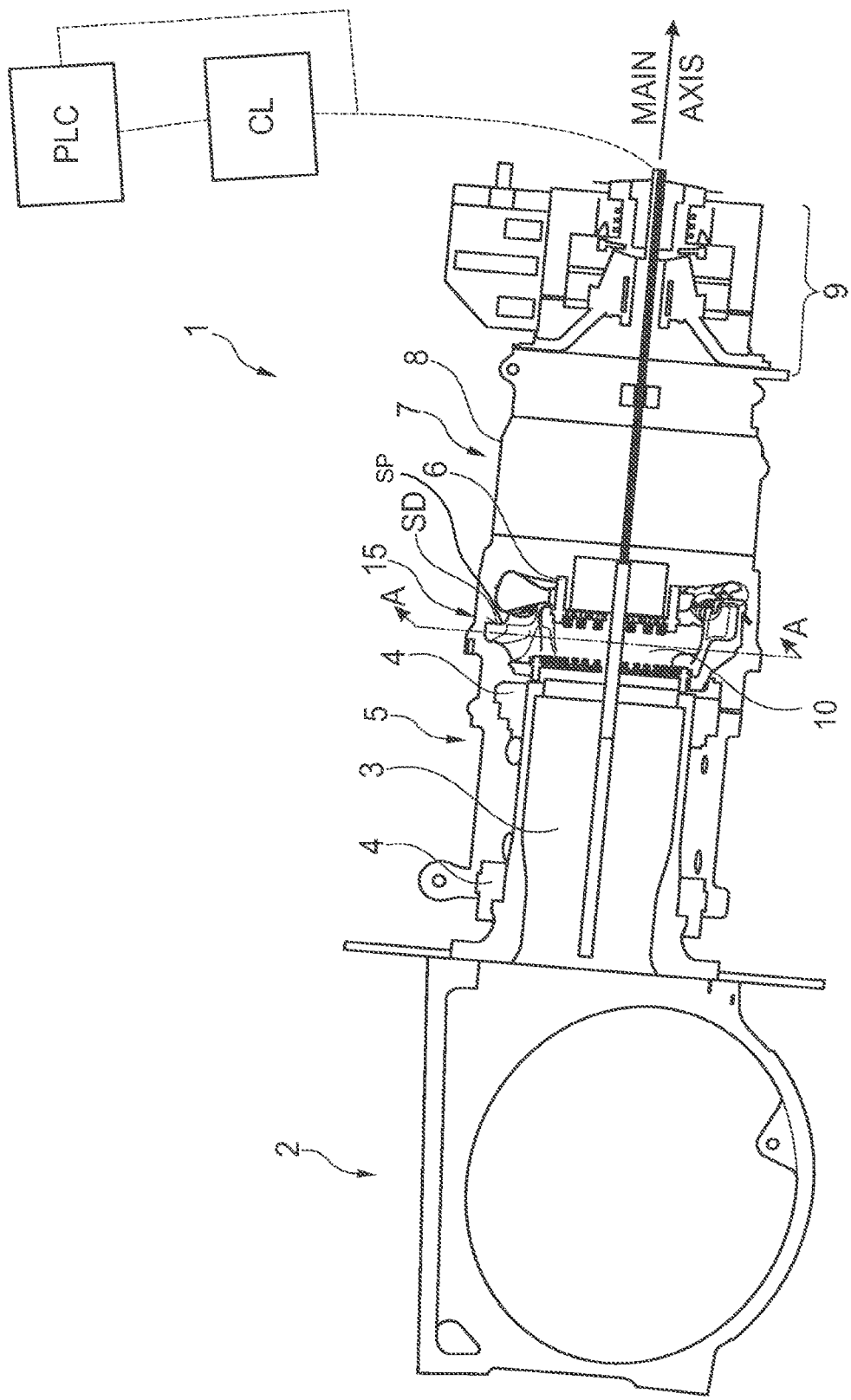
FIG. 1 is simplified representation of a part of a drive train according to an embodiment.

FIG. 1 is simplified representation of a part of a transmission system 1 according to an embodiment. The transmission system 1 comprises a hub 2, a rotor shaft (or main shaft) 3, a main bearing 4, a main bearing housing 5, a gearbox input shaft 6, a gearbox 7 with a gearbox housing 8 and a generator 9. Between the rotor shaft 3 and the gearbox input shaft 6 is the elastic coupling 10. The elastic coupling 10 comprises a first coupling part 11 and a second coupling part 12. The elastic coupling 10 has a coupling housing 15.

There is further a sensor device SD in and/or on the elastic coupling 10 and/or the coupling housing 15, which is only one example for the various sensor devices described herein and in more detail below. The sensor signals acquired and/or processed by the sensor devices SD can be transmitted through wires/cables within the shaft(s) of the drive drain 1 towards the generator. This is advantageous for sensor devices, in particular sensor units of sensor devices SD which are attached to rotating parts, such as the elastic coupling 10. The sensor devices SD can further comprise sensor signal processing units SP. There is also a control logic CL and a programmable logic control PLC which can be configured to process signals from the sensor devices SD.

Figure 2:
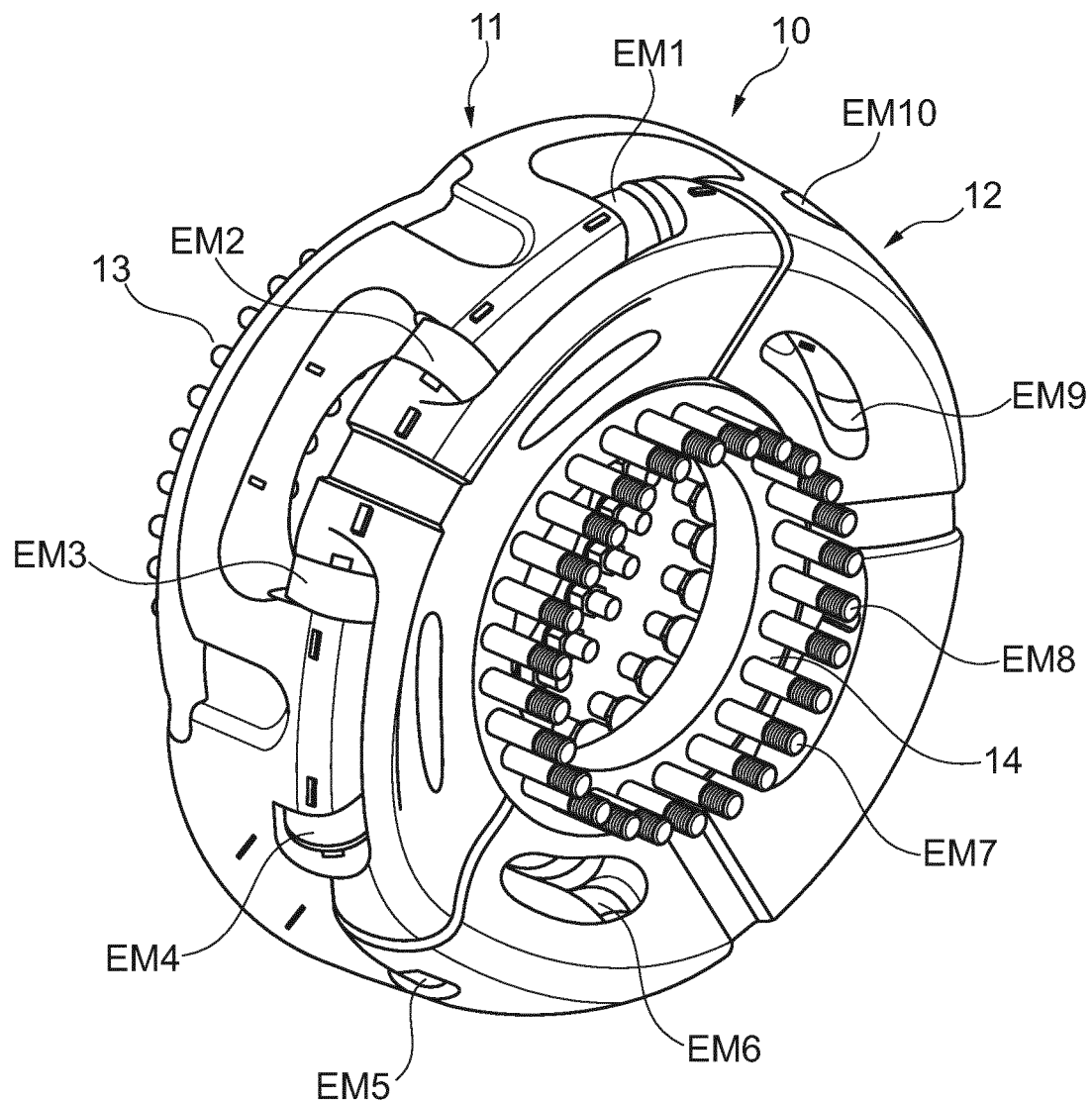
FIG. 2 is a simplified perspective view on an elastic coupling according to an embodiment.

FIG. 2 is a simplified perspective view on an elastic coupling 10 according to an embodiment. The elastic coupling 10 comprises the first coupling part 11 and the second coupling part 12. The first coupling part 11 has a flange 13 by which it can be rigidly coupled to the rotor shaft 3. The second coupling part 12 has a flange 14 by which it can be rigidly coupled to the gearbox input shaft 6. The first coupling part 11 is coupled to the second coupling part 12 by a plurality of elastic elements EM1 to EM10 (EM7 and EMS are not visible in this perspective). The elastic elements EM1 to EM10 are evenly distributed along a circumferential direction of the first coupling part 11 and the second coupling part 12. Although the present embodiment shows ten elastic elements EM1 to EM10, any number of elastic elements can be used in other embodiments. At least one or all of the elastic elements EM1 to EM10 can be pre-stressed (squeezed, compressed) in a non-loaded condition in order to increase the stiffness in a specific load direction. In particular, the torsional stiffness can be increased by pre-stressing the elastic elements EM1 to EM10. The stiffness is advantageously increased in the main load torque direction which can then correspond to the dominant axis and/or the dominant direction of stiffness of the elastic elements.

Figure 3:
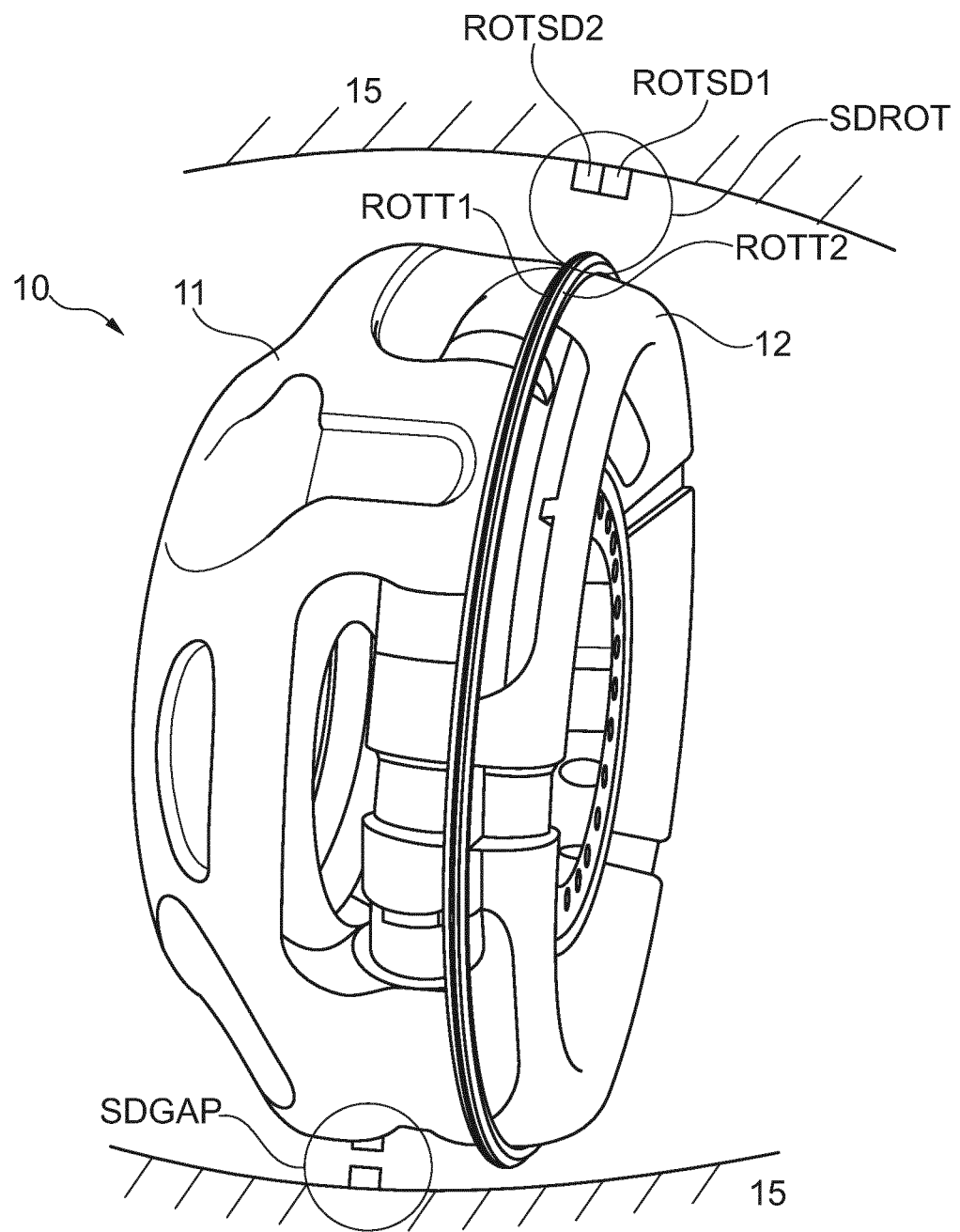
FIG. 3 is a simplified perspective view on an elastic coupling according to an embodiment including a rotational sensor device and a radial gap sensor device.

FIG. 3 is a simplified perspective view on an elastic coupling 10 according to an embodiment including a rotational sensor device SDROT and a radial gap sensor device SDGAP. In this embodiment, the elastic coupling 10 (including the coupling housing 15) comprises a rotational sensor device SDROT. The rotational sensor device SDROT comprises rotational sensor units ROTSD1, ROTSD2 and corresponding rotational sensor targets ROTT1, ROTT2. The first coupling part 11 and the second coupling part 12 of the elastic coupling 10 each comprise one of the rotational sensor targets ROTT1, ROTT2. Each rotational sensor target ROTT1, ROTT2 is attached to the respective circumference of the respective coupling part 11, 12 for determining a relative rotational speed and/or a phase shift and/or a load torque. In an embodiment, the rotational sensor targets ROTT1, ROTT2 can be of an optical type, a magnetic type and/or physically marked (for example toothed). One or more rotational sensor units ROTSD1, ROTSD2 (for example configured as an encoder) corresponding to the rotational sensor targets ROTT1, ROTT2 are arranged at/mounted on the coupling housing 15. One sensor unit ROTSD1 is provided for the sensor target ROTT1 coupled/attached to the first coupling part 11 (connected with the rotor shaft 3), and another rotational sensor unit ROTSD2 is provided for the rotational sensor target ROTT2 coupled/attached to the second coupling part 12 (connected with the gearbox input shaft 6).

Furthermore, a rotational sensor signal processing unit (not shown) may be provided at the housing 15. The sensor signal processing unit may be configured to determine and/or process a phase shift between the rotational position of the rotor shaft 3 and the rotational position of the gearbox input shaft 6 based on the output of the rotational (speed) sensor device SDROT.

The control logic CL shown in FIG. 1 can be configured to determine a torque transferred by the elastic coupling 10 based on stiffness properties of the (combined) elastic elements EM of the elastic coupling 10 and a phase shift. Alternatively, the central programmable control logic PLC shown in FIG. 1 can be configured to perform the required signal processing.

In an embodiment, the control logic CL can be further configured to determine whether stiffness properties of the elastic elements are in a required range based on (a) the phase shift and (b) a transmitted torque signal provided by the programmable logic controller PLC of the wind turbine representing the transmitted torque.

In this embodiment, the rotational sensor targets ROTT1, ROTT2 on the first coupling part 11 and the second coupling part 12 of the elastic coupling 10 are configured as closed rings along the circumference. In another embodiment, the sensor targets ROTT1, ROTT2 on the first coupling part 11 and the second coupling part 12 of the elastic coupling are discontinuous along the circumference.

A sensor signal processing unit (not shown) can be configured to determine the rotational speed of the rotor shaft 3 and/or the gearbox input shaft 6 and to provide the signal to the wind turbine PLC.

The drive train 1, in particular the elastic coupling 10 can further comprise one or more proximity and/or distance sensor devices SDGAP which are configured to determine the gap/distance between the coupling housing 15 and the first coupling part 11 and/or the second coupling part 12. The output of such a distance sensor SDGAP can be taken into account for determining the coupling condition and/or generating the phase shift signal.

Figure 4:
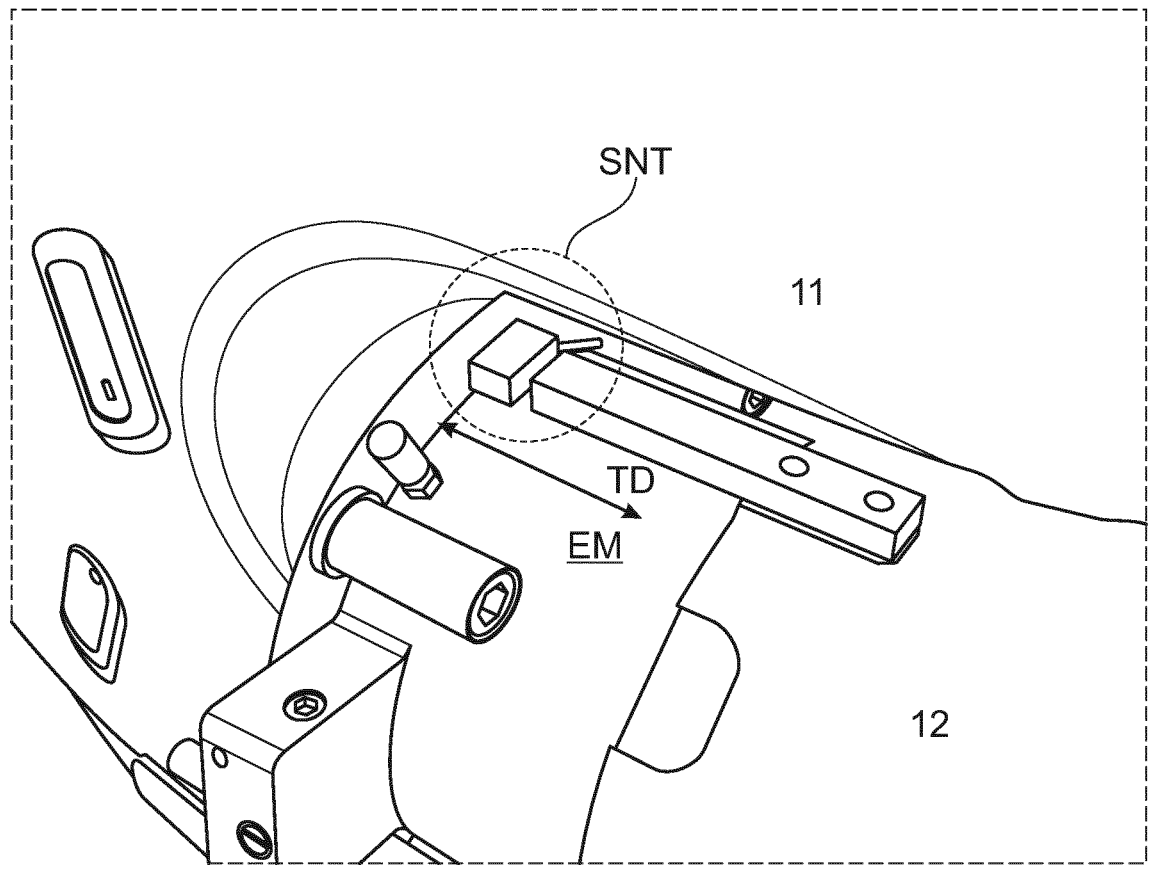
FIG. 4 is a simplified detailed view on a tangential sensor device.

FIG. 4 is a simplified detailed view on a tangential sensor device SNT which is attached along an elastic element EM of the elastic coupling 10. The tangential sensor device SNT determines a length of the elastic element EM, or rather a change of length along the tangential direction (also referred to as circumferential direction of the elastic coupling 10). From the length in direction TD (arrow), it can be derived whether and to which extent the elastic element EM is compressed under the current load torque. The measured length can for example be the extension/length and/or change of extension/length of the elastic element EM along the dominant axis of stiffness of the elastic element EM and between the first coupling part 11 and the second coupling part 12 in the tangential/circumferential direction.

This allows to derive the amount of torque and the properties/condition/state of the elastic module EM. Each elastic module EM in the elastic coupling 10 may have a tangential sensor device SNT. The tangential sensor device SNT may also comprise a sensor unit and a sensor target. The tangential sensor device may be a distance sensor based on/using laser technology.

The tangential sensor device SNT can also be configured to determine a distance and/or change of distance between the first coupling part 11 and the second coupling part 12 in the tangential direction.

Figure 5:
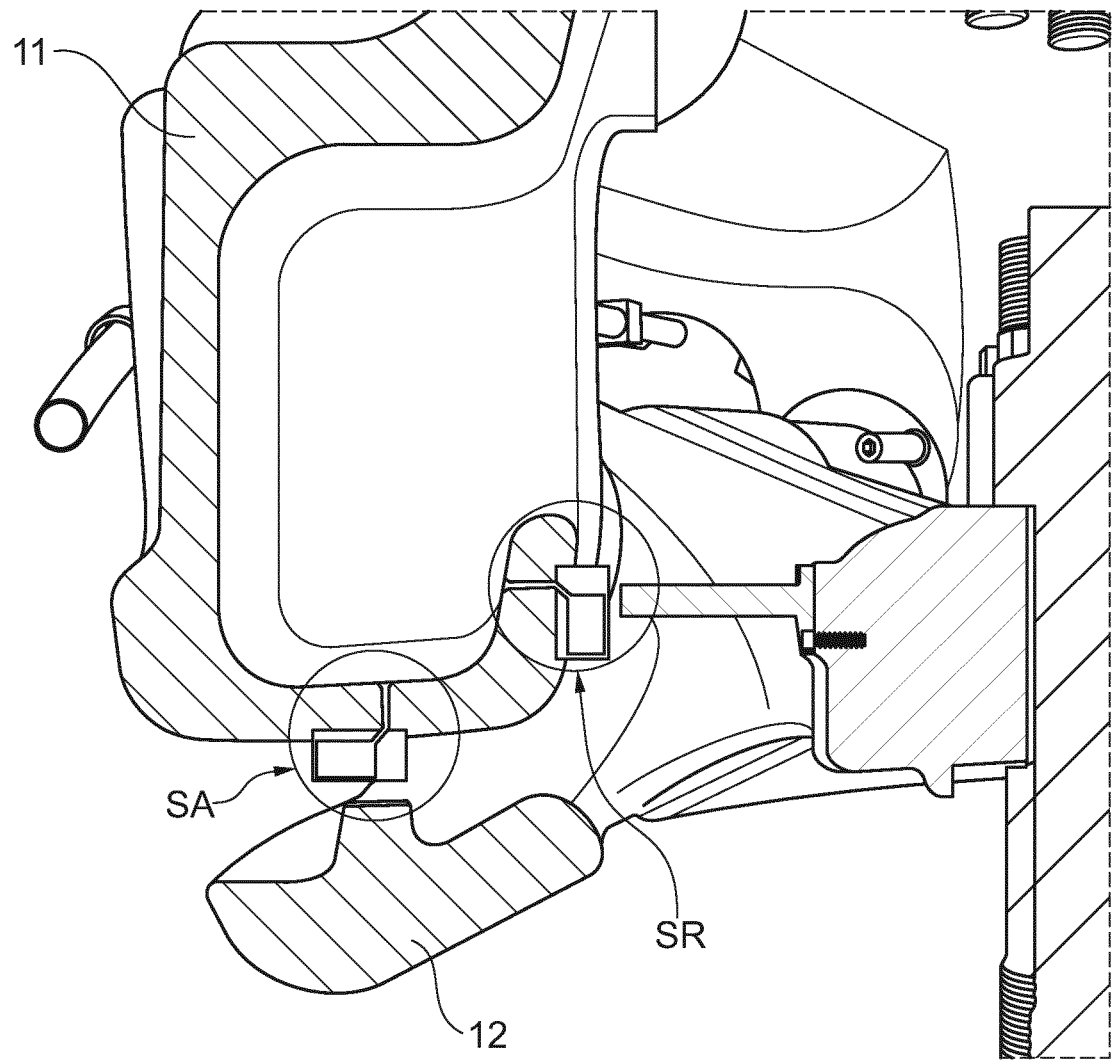
FIG. 5 is a simplified detailed view on a radial sensor device and axial sensor device.

FIG. 5 is a simplified detailed view on a radial sensor device SR and axial sensor device SA which are both coupled to the first coupling part 11 and the second coupling part 12 in order to determine a displacement and/or distance of the first coupling part 11 with respect to the second coupling part 12 in the axial direction and in the radial direction. This allows determining properties/condition/state of the elastic coupling and in particular of the elements EM. A plurality of radial and axial sensor devices SR, SA may be provided. The radial and the axial sensor devices SR, SA may also comprise a sensor unit and a sensor target. The tangential sensor device may be a distance sensor based on/using laser technology.

Since the axial, radial and tangential sensor devices are attached to the rotating elastic coupling, the signals provided by these sensors can be transmitted via cable through the rotating shafts and picked up downstream of the drive train in a contactless manner of per commutator or slip rings etc.

Figure 6:
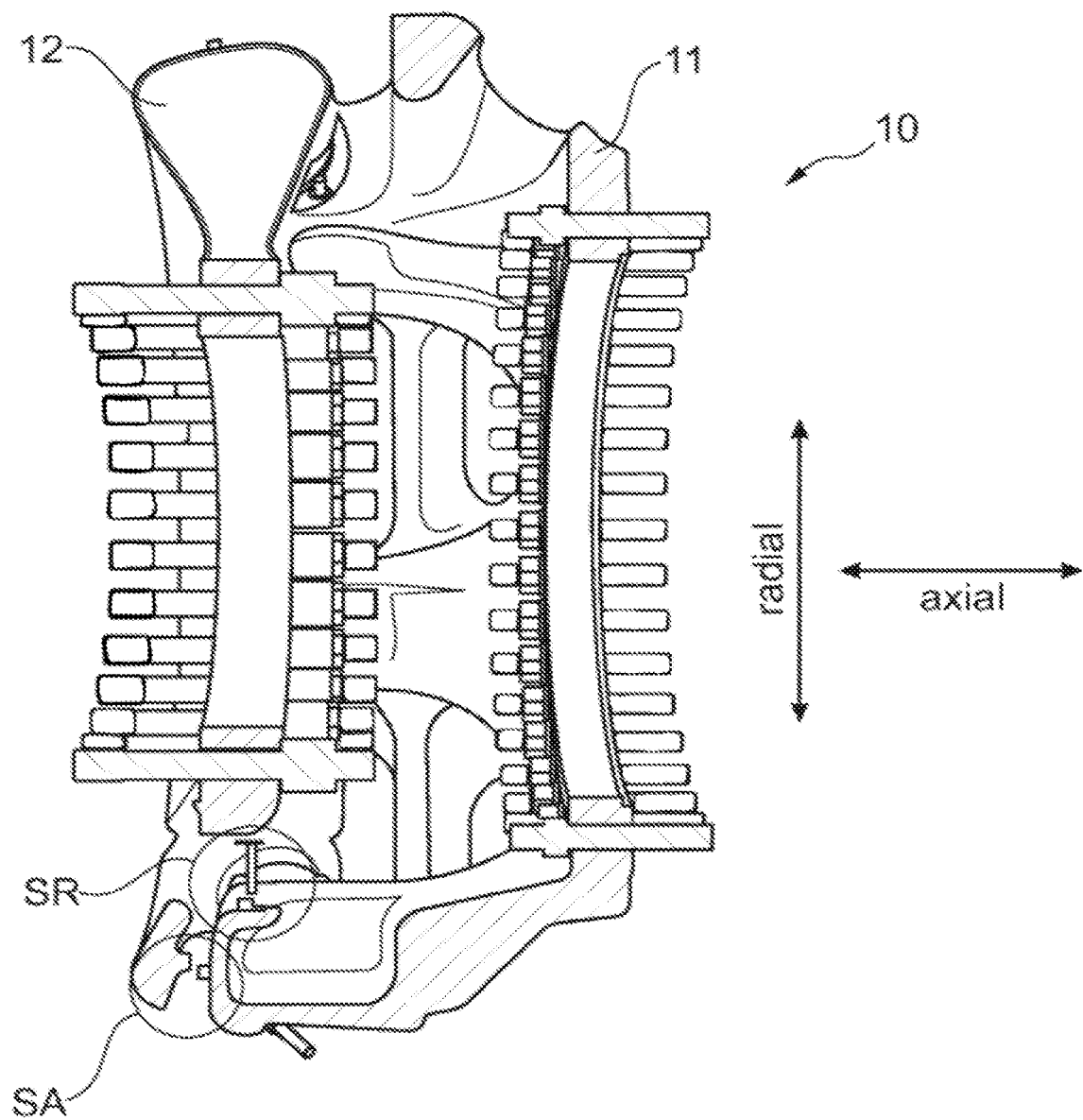
FIG. 6 is a simplified cross-sectional view of an elastic coupling according to an embodiment showing a radial sensor device and axial sensor device.

FIG. 6 is a simplified cross-sectional view of an elastic coupling 10 according to an embodiment showing the radial sensor device SR and the axial sensor device SA.

Figure 7:
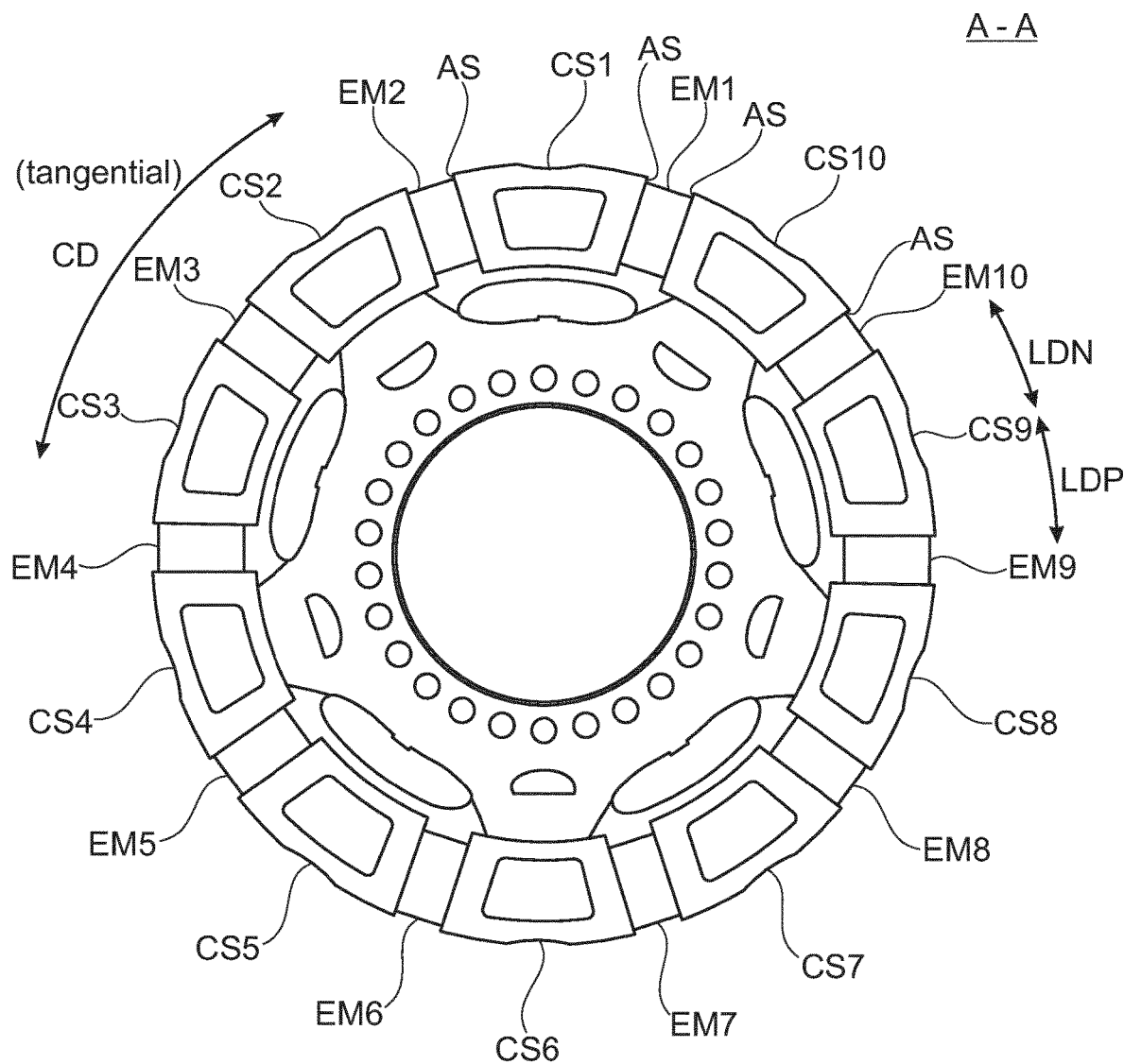
FIG. 7 is a simplified cross-sectional view along line A-A in FIG. 1 of an elastic coupling according to an embodiment.

The directions "radial", "axial" and "tangential" are indicated in FIG. 6 and FIG. 7 and further defined as follows: "Axial" relates to the direction of the main axis of the drive train 1 (indicated in FIG. 1), i.e. the longitudinal axis of the rotor shaft 3 and the gearbox input shaft 6 etc. "Radial" relates to a direction that is oriented radial to the axial direction as previously described. "Tangential" relates to the direction that is tangential to the axial direction as previously described. In other words, the tangential direction is the circumferential direction around the main axis.

In an advantageous embodiment, the elastic coupling 10 comprises all the described sensor devices. The values, distances etc. determined/detected by the sensor devices can generally and advantageously be used to determine a condition of the elastic coupling 10. The values, distance etc. determined/detected by the sensor devices SA, SR, SNT, SDROT, SDGAP can be used in order to adapt or change the properties of the elastic coupling 10, in particular the properties of the elastic elements EM of the elastic coupling 10. Such a property can be the stiffness of the elastic elements in a specific direction, for example the dominant direction of stiffness or any other direction (as described herein). The adaption/maintenance/exchange of the elastic coupling 10 is advantageously be done in response to output signals provided by at least one or all of the sensor devices. The adaption/maintenance/exchange of the elastic elements may be performed automatically. An automatic adaption/maintenance may be performed by adapting a pressure in a hydraulic circuit to which one or more of the elastic elements are.

FIG. 7 is a simplified cross-sectional view of an elastic coupling 10 along line A-A in FIG. 1 according to the embodiment shown in FIG. 1 and FIG. 2. The elastic elements EM1 to EM10 are substantially evenly distributed along a circumferential direction CD. In this embodiment, the elastic elements EM1 to EM10 are arranged in pairs of two elastic elements: EM1 and EM2, EM3 and EM4, EM5 and EM6, EM7 and EM8 as well as EM9 and EM10. Accordingly, there are five pairs of elastic elements. There is always a circumferential section CS1 to C10 of one of the first or second coupling part 11, 12 between adjacent elastic elements. Circumferential sections CS1, CS3, CS5, CS7 and CS9 belong to the first coupling part 11. Circumferential sections CS2, CS4, CS6, CS8 and CS10 belong to the second coupling part 12. Accordingly, each elastic element E1 to E10 is located between a circumferential section of the first coupling part 11 and a circumferential section of the second coupling part 12. The circumferential sections CS1 to CS10 provide attachment surfaces AS for the elastic elements EM1 to EM10 on opposite ends of the each elastic element EM1 to EM10.

The circumferential direction CD is also the direction of the torque load. However, the torque load can have a first direction LDP or a second direction LDN which are opposite to each other. In the present context, a torque or load torque or load torque direction is represented and described rather by the rotational direction than by the vector representation, as the referral to the rotational directions is considered more intuitive.

Figure 8:
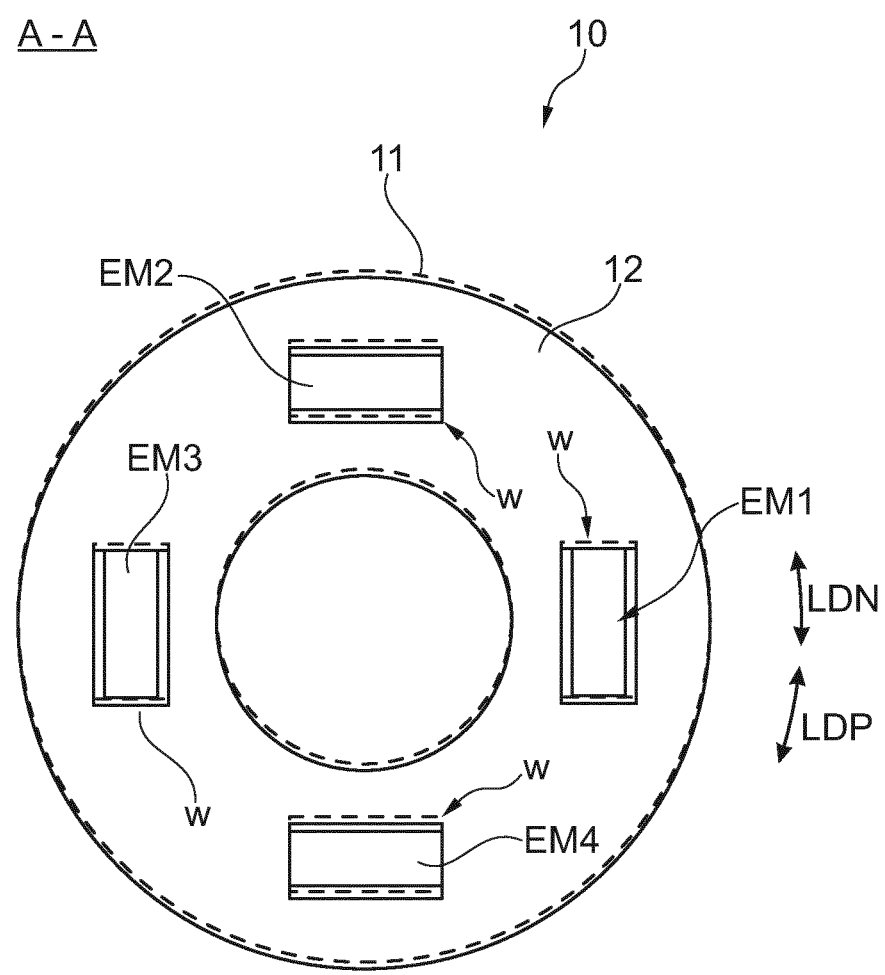
FIG. 8 is a simplified cross-sectional view along line A-A in FIG. 1 of an elastic coupling according to an embodiment in a first load condition.

FIG. 8 is a simplified cross-sectional view of an elastic coupling 10 along line A-A in FIG. 1 in a first load condition according to an embodiment. This embodiment of an elastic coupling 10 differs from the previous one in that each of the elastic elements EM1 to EM4 is configured and arranged such that the elastic elements EM1 to EM4 can be loaded in positive torque direction LDP as well as in the negative torque direction LDN. The first coupling part 11 and the second coupling part 12 are represented as disks having superposed windows W through which each of the elastic elements EM1 to EM4 protrudes. The first coupling part 11 is represented in dashed lines while the second coupling part 12 is represented by solid lines. The shown load condition is an undeflected situation such that no torque load is applied and the rotor shaft 3 and the gearbox input shaft 6 and therefore the coupling parts 11, 12 are not misaligned.

Figure 9:
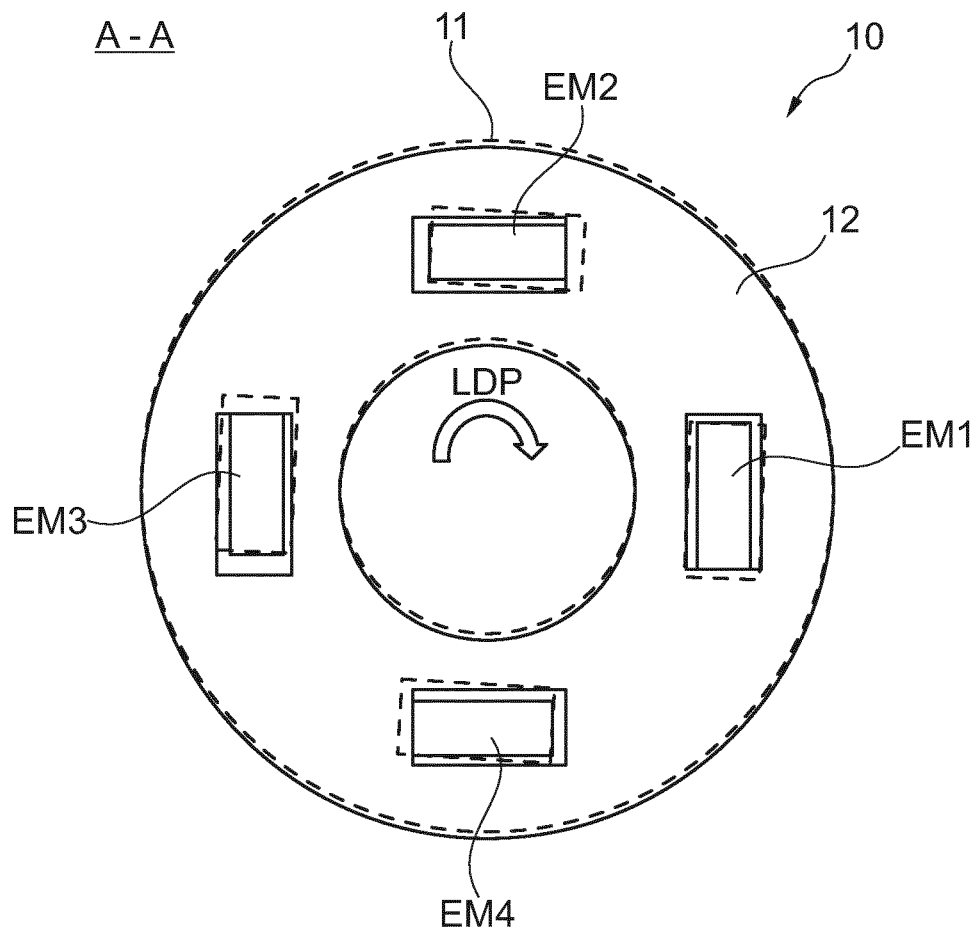
FIG. 9 is a simplified cross-sectional view along line A-A in FIG. 1 of an elastic coupling according to an embodiment in a second load condition.

FIG. 9 is a simplified cross-sectional view of the an elastic coupling 10 along line A-A in FIG. 1 (similar to the embodiment of FIG. 8) in a second load condition. In this load condition, load torque is applied to the elastic coupling 10 but the axes of the gearbox input shaft and the rotor shaft are still well aligned.

Figure 10:
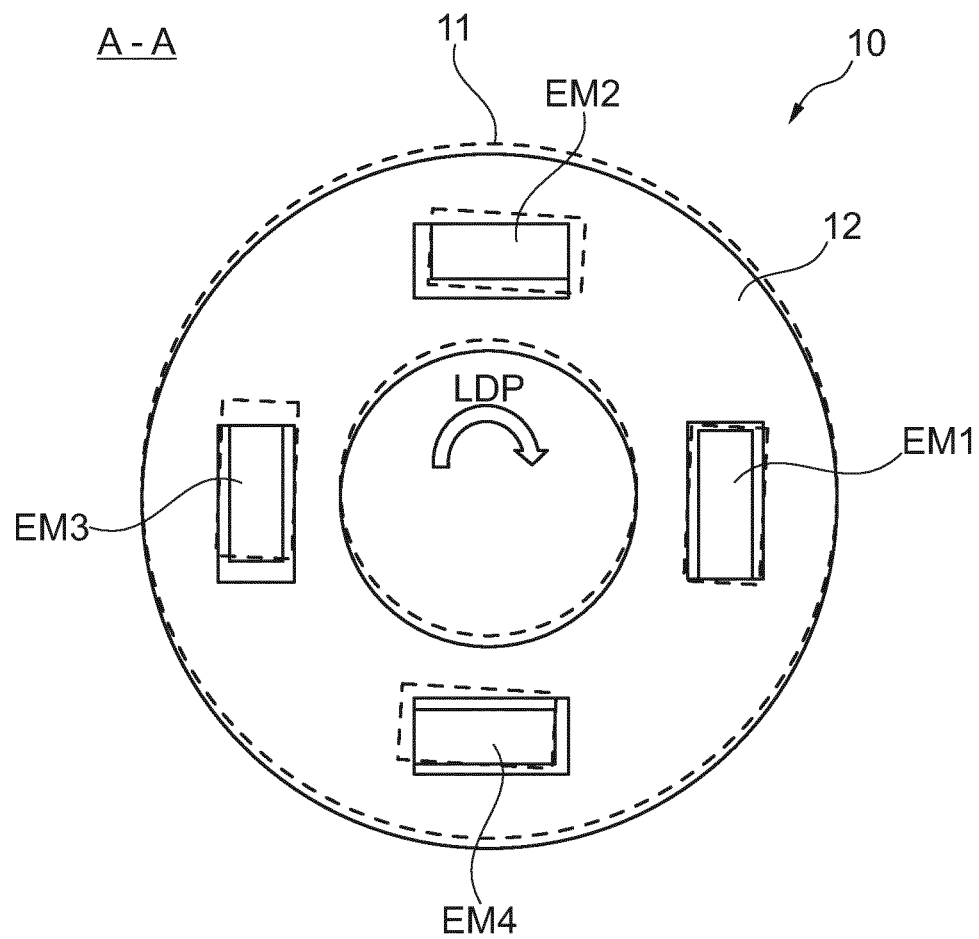
FIG. 10 is a simplified cross-sectional view along line A-A in FIG. 1 of an elastic coupling according to an embodiment in a third load condition.

FIG. 10 is a simplified cross-sectional view of the an elastic coupling 10 along line A-A in FIG. 1 (similar to the embodiment of FIG. 8 and FIG. 9) in a third load condition. In this load condition load torque is applied and the main axes are misaligned.

Figure 11:
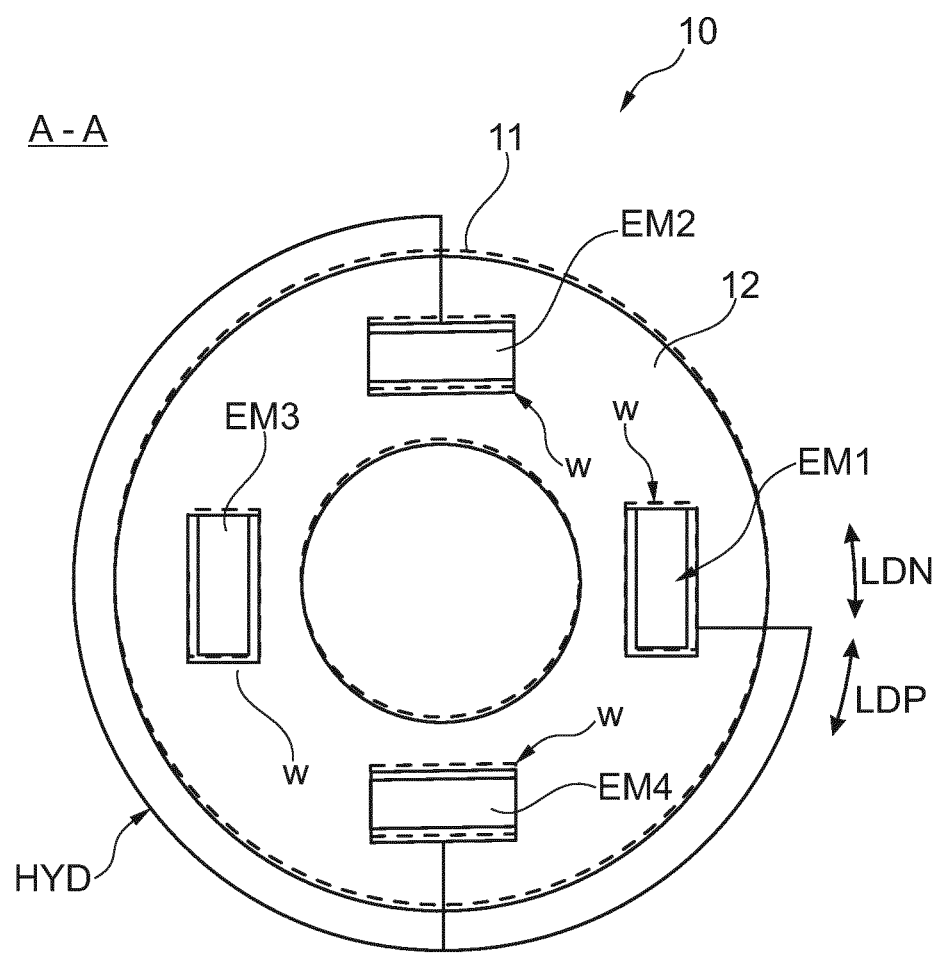
FIG. 11 is substantially similar to FIG. 8 including an additional detail.

FIG. 11 is substantially similar to FIG. 8 including an additional detail. This embodiment uses elastic elements EM1 to EM4 which are also referred to as hydraulic rubber elements or hydraulic elastomers etc. (more details of such an element are described with respect to FIG. 15). These elements have an inner chamber that can be filled with a fluid in order to adjust the stiffness (for example torsional stiffness). The elastic elements or rather the chambers of the elastic elements are coupled to a hydraulic circuit. If only a single elastic element EM1 to EM4 can be used for both load torque directions, as described herein, a single hydraulic circuit HYD can be used for all elements EM1 to EM4 instead of two separate hydraulic circuits for the elastic elements of each load torque direction.

Figure 12:
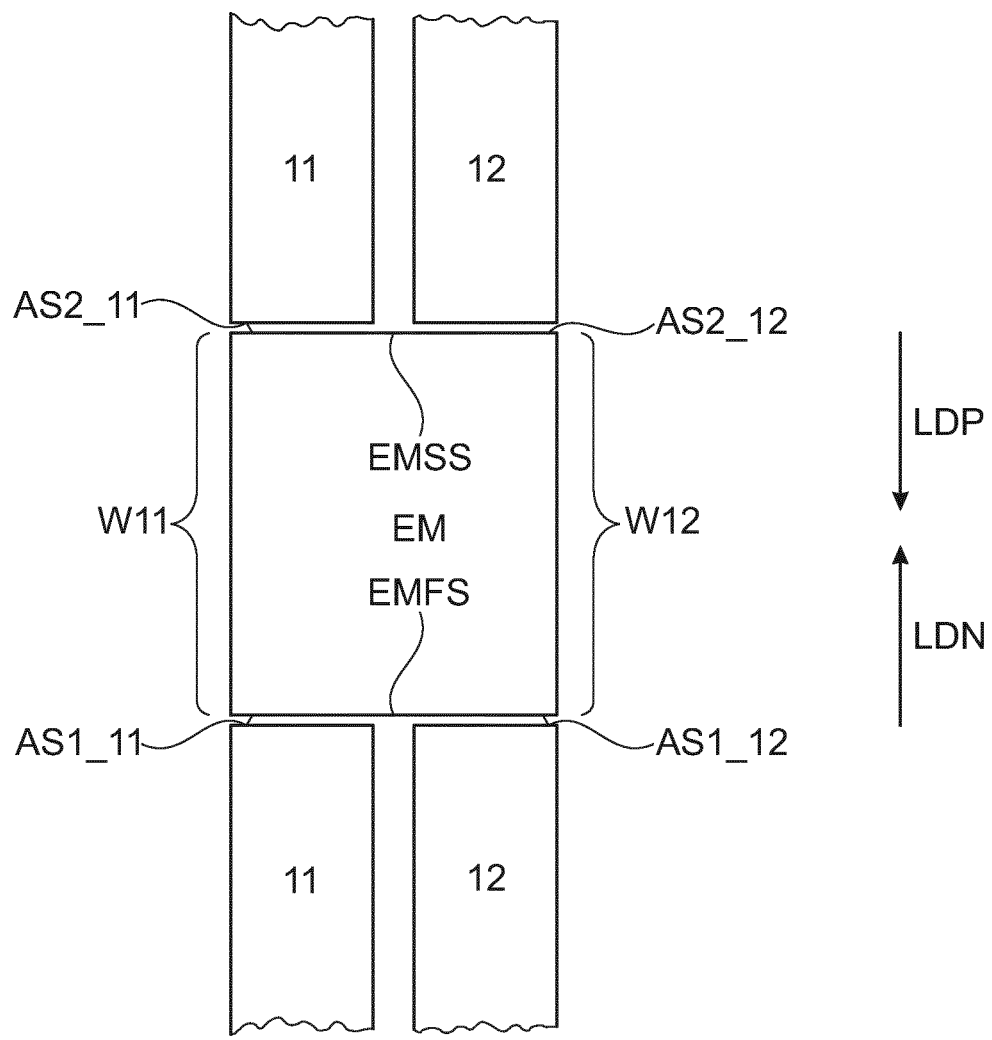
FIG. 12 is a simplified cross-sectional view of a part of the embodiments shown in FIGS. 8 to 10 using a single elastic element.

FIG. 12 is a simplified cross-sectional view of a part of the embodiments shown in FIGS. 8 to 10 using a single elastic element EM for two opposite torque load directions. Each of the elastic elements (in FIG. 8 to 10) can be the elastic element EM shown in FIG. 11. The first coupling part 11 provides at least a first attachment (or abutment) surface AS1_11 and an opposite second attachment (or abutment) surface AS2_11. The second coupling part 12 also provides at least a first attachment (or abutment) surface AS1_12 and an opposite second attachment (or abutment) surface AS2_12. In this embodiment, one attachment (or abutment) surface AS1_11, AS1_12 of each of the two coupling parts 11, 12 is in contact with a same first side EMFS of the elastic element and one attachment (or abutment) surface AS2_11, AS2_12 of each of the two coupling parts 11, 12 is in contact with a same second side EMSS of the elastic element. The second side EMSS of the elastic element EM is opposite to the first side EMFS of the elastic element. In an embodiment, the abutments surfaces AS1_11, AS2_11, AS1_12, AS2_12 can be provided by superposed or coinciding windows W11, W12 in the coupling parts. However, there are various different possible configurations. A minimum requirement is that each of the two opposite sides EMFS, EMSS of the elastic element should at least abut against an abutment or attachment or contact surface of both, the first and the second coupling part 11, 12. In other words, the elastic elements are located on congruent attachment/abutment surfaces of the first and the second coupling part such that a single elastic element is loaded in a positive torque direction as well as in a negative torque direction.

This provides that a single elastic element EM can be used for both, opposite load torque direction, i.e. the positive torque direction LDP and the negative torque direction LDN. The elastic element is than only compressed or squeezed along the dominant axis or direction of stiffness regardless of the load torque direction. The number of required elastic elements EM can then be reduced to half the number of embodiments using pairs of modules.

In an aspect, if the elastic elements use a chamber for fluid for adjusting the stiffness of the elastic elements, all the elastic elements can be hydraulically coupled with each other. It is not necessary to separate the hydraulic connection into one system for positive load torque and one system for negative load torque.

Figure 13:
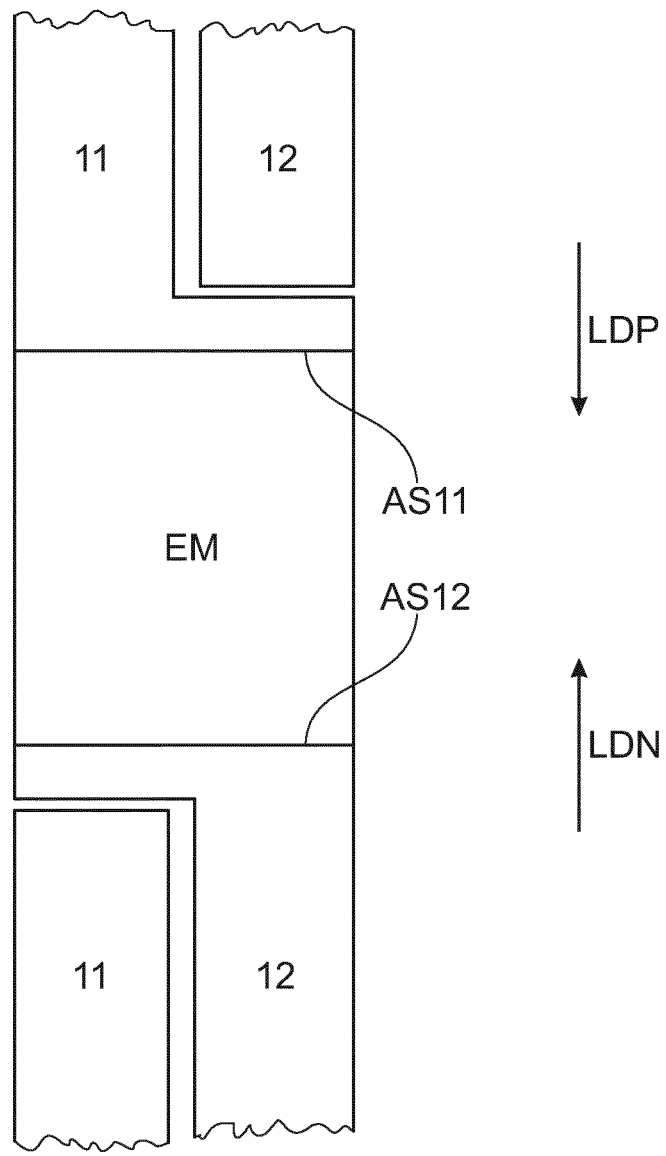
FIG. 13 is a simplified cross-sectional view of a part of the embodiments shown in FIGS. 8 to 10 using a single elastic element.

FIG. 13 is a simplified cross-sectional view of a part of the embodiments shown in FIGS. 8 to 11 using a single elastic element EM for two opposite torque load directions according to another embodiment. In this embodiment, the elastic element EM is only held between one abutment, attachment and/or pushing surface (or shoulder) AS11 of the first coupling part 11 at one end of the elastic element EM and one abutment, attachment and/or pushing surface (or shoulder) AS12 of the second coupling part 12 at another, opposite end of the elastic element EM. However, the respective abutment surface AS11 and A12 of each coupling part 11, 12 extends over and covers the respective other coupling part. This embodiment is advantageous if the elastic element EM does not need to be pre-stressed.

Figure 14:
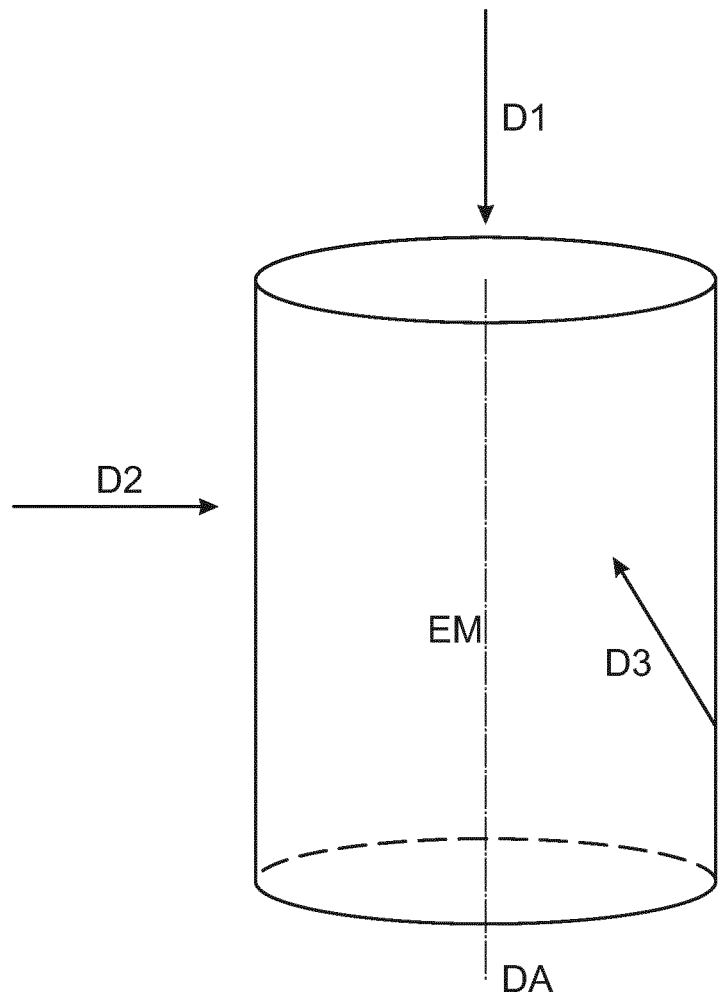
FIG. 14 is a simplified perspective view on an elastic element according to an embodiment.

FIG. 14 is a simplified perspective view on an elastic element EM to be used for the embodiments and aspects described herein. The dominant direction D1 is the direction of a force (due to torque) in which the elastic element EM has the greatest stiffness. It should be noted that the elastic element EM is supposed to be compressed or squeezed in the dominant direction D1. Just as examples other directions D2, D3 of potential forces are also indicated. The elastic element EM has a lower stiffness in the directions D2 and D3 and any other direction different than D1.

In still other words, any elastic element EM has a dominant axis of stiffness DA and a dominant direction of stiffness D1 lying in the dominant axis of stiffness DA. The dominant direction of stiffness D1 is advantageously a direction in which the elastic element EM is compressed. The stiffness of the elastic element EM is greater in the dominant direction of stiffness D1 than in any direction relative to the elastic element EM different from the dominant direction D1.

Figure 15:
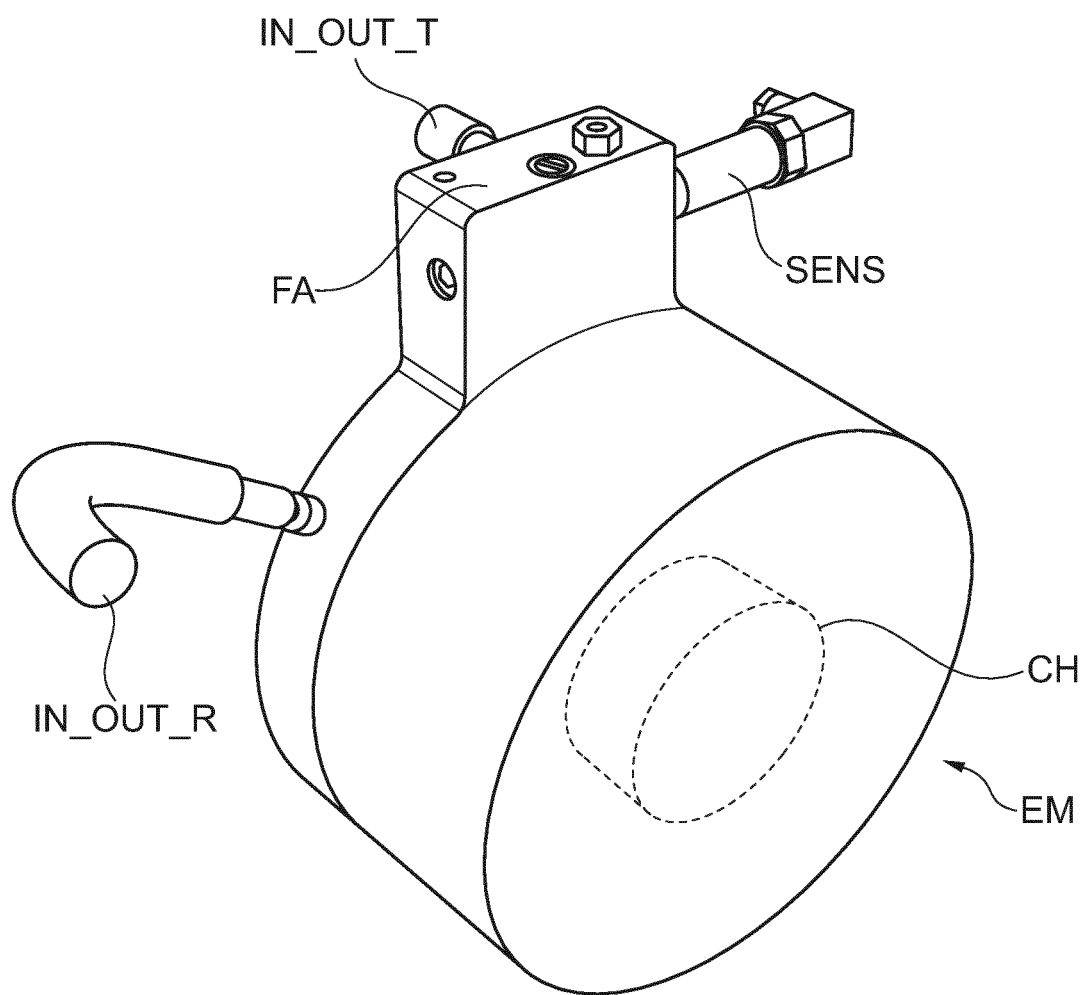
FIG. 15 is a simplified perspective view on an elastic element according to an embodiment.

FIG. 15 is a simplified perspective view on an elastic element EM that can be used in connection with the aspects and embodiments of the invention. Generally, at least one or all of the elastic elements can comprise or be made of rubber, polymer, elastic material or combinations of rubber and/or polymer and/or elastic material and/or stiff components. At least one or all of the elastic elements can be configured or be made in form of springs, helical springs, and/or coil springs. At least one or all of the elastic elements can have the form of pads, cylinders, or cubicles.

The elastic element EM shown in FIG. 15 is generally made of an elastic material (like rubber or polymers etc.) and comprises an inner chamber CH (dashed lines) that can be filled with a fluid in order to adjust the stiffness. The elastic element EM can further comprise inlet and outlets for the fluid. In this embodiment, there is a radial inlet/outlet IN_OUT_R and a tangential inlet/outlet IN_OUT_T. Furthermore, there is a fluid access FA and a pressure sensor SENS for determining the pressure in the chamber CH of the elastic element EM.

The elastic element EM can also be referred to as rubber hydraulic element. It can have a pitch cycle diameter of 2300 mm, a weight of 38 kg and provide a high torsional stiffness in the dominant direction. It further provides a low axial and lateral stiffness, i.e. in directions other than the dominant direction. The elastic element can operate with a hydraulic pressure of max. 600 bar. It can be hydraulically coupled with other elastic elements of a similar type through hoses or tubes (hydraulic circuit). The working pressure of these tubes or hoses can be 1040 bar, while the minimum burst pressure could be 2600 bar.

Figure 16:
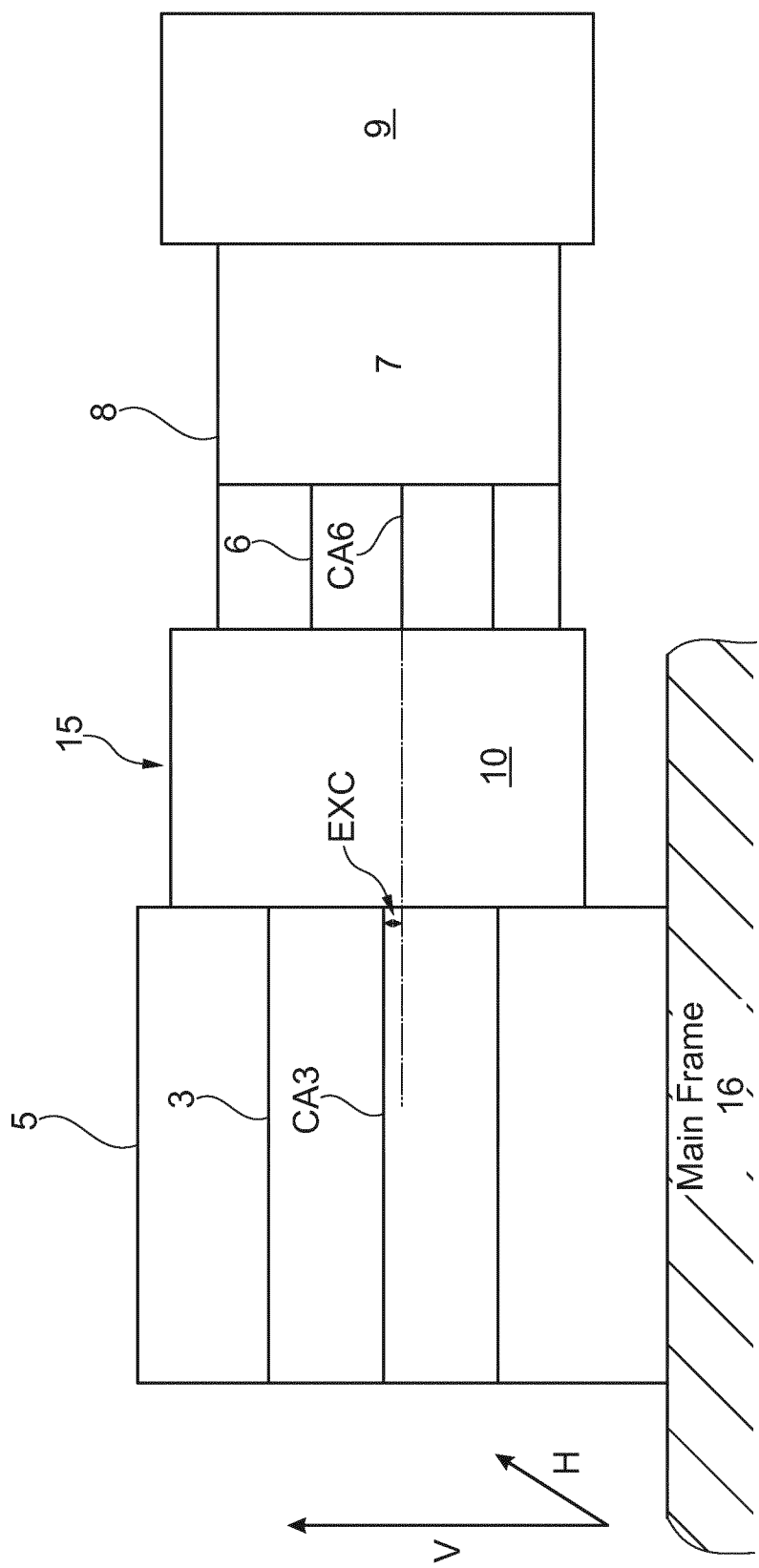
FIG. 16 shows a simplified side view of a part of the drive train of a wind turbine according to an embodiment.

FIG. 16 shows a simplified side view of a part of the drive train 1 of a wind turbine according to an embodiment. There is a main frame 16 (supporting structure of a nacelle (not shown) of a wind turbine (not shown). The drive train comprises a rotor shaft (or main shaft) 3 which is held by the main bearing 4 (not shown) in the bearing housing 5. Only the bearing housing 5 is suspended from or carried by the main frame 16. The coupling housing 15 including the elastic coupling 10, the gearbox housing 8 including the gearbox input shaft 6 and the gearbox 7 as well as the generator 9 are only suspended from the bearing housing 5. They all extend freely over the main frame 16. The entire weight of the elastic coupling 10, the gearbox, and the generator 9 including all their housings and internal parts can introduce an eccentricity between the rotor shaft 3 and the gearbox input shaft 6.

In an embodiment, a longitudinal axis A3 of the rotor shaft 3 and a longitudinal axis A6 of the gearbox input shaft 6 are then mounted/assembled with a predetermined and preset eccentricity EXC with respect to each other in order to minimize the offset/eccentricity resulting from, for example weight and/or other loads and/or other effects. Normally, it is most advantageous that the rotor shaft 3 and the gearbox input shaft 6 of a drive train 1 of a wind turbine are perfectly aligned and centered with respect to each other. Otherwise, any coupling and in particular an elastic coupling 10, more specifically the elastic elements EM of the elastic coupling 10, as described herein, can be constantly agitated/ worked through during each rotation. This can substantially increase the wear of the elastic elements EM. According to the present embodiment, the rotor shaft 3 and the gearbox input shaft 6 are arranged with respect to each with a slight eccentricity in order to compensate any other effects that introduce an opposite eccentricity. If for example the coupling housing 15, the gearbox housing 8 and the generator 9 are all freely suspended from the bearing housing 5, this can introduce a slight eccentricity between the rotor shaft 3 and the gearbox input shaft 6 which results in an eccentricity in the elastic coupling 10, in particular an eccentricity of the first coupling part 11 with respect to the second coupling part 12. This and any other eccentricity can then be compensated, for example by the suspension of the bearing housing 5, in particular the suspension of the main bearing 4 in the bearing housing 5. The bearing housing 5 may be coupled to the main frame 16 of the nacelle by an annular (ring-shaped) flange (not shown). This flange can be used to create the eccentricity between the rotor shaft 3 and the gearbox input shaft 6. In particular, the center point of the bearing may be shifted during mounting/assembly. An advantageous direction is a preset eccentricity in a vertical direction V. It is also possible to create the preset eccentricity in any other directions, as for example the horizontal direction H. The preset eccentricity is advantageously in the range of less than 1 mm. The preset eccentricity provides that the elastic elements EM are not or less agitated during each rotation. Since the gearbox 7 (housing) and the generator 9 (housing) are suspended on the bearing housing 5, the weight of these components can introduce an eccentricity that is to be compensated by a predetermined and preset eccentricity in the opposite direction. Accordingly, an expected or determined eccentricity can be compensated by a slight preset and compensating (for example opposite) eccentricity introduced by a shift of the bearing housing 5. The preset eccentricity of the longitudinal main axes of the rotor shaft and the gearbox input shaft can be used to compensate and/or minimize any eccentricity or offset resulting from weight and/or loads and/or torque. The relevant torque could be the normal expected torque during operation of the wind turbine. In order to achieve the preset eccentricity the center point of the bearing housing may be slightly shifted. The center point of the bearing housing may be shifted vertically. This has an influence on the bending line such that in total, the undesired eccentricities are compensated by the preset eccentricity during mounting and/or assembling of the wind turbine/drive train.

It should be noted that the aspects and embodiments are particularly synergetic. Monitoring of an elastic coupling of a drive train is important as the elastic elements of the elastic coupling can be subject to aging or wear. This requires a constant monitoring and, if any problems occur an adaption, maintenance or exchange of the elastic elements.

Although the invention has been described hereinabove with reference to specific embodiments, it is not limited to these embodiments and no doubt further alternatives will occur to the skilled person that lie within the scope of the invention as claimed

The invention claimed is:

1. A drive train for a wind turbine comprising:
a rotor shaft configured to be driven by a rotor about a main axis;
a support structure including a bearing housing surrounding at least one bearing and supporting the rotor shaft for rotation about the main axis, thereby constraining other movements of the rotor shaft;
a gearbox input shaft and a gearbox housing supporting the gearbox input shaft for rotation about the main axis while constraining other movements of the gearbox input shaft; and
an elastic coupling that couples the gearbox input shaft to the rotor shaft, the elastic coupling comprising a first coupling part rigidly connected with the rotor shaft, a second coupling part rigidly connected with the gearbox input shaft, and
elastic elements positioned between the first and the second coupling part, thereby constituting a single joint between the rotor shaft and the gearbox input shaft,
wherein the rotor shaft and the gearbox input shaft are mounted with a preset eccentricity of longitudinal main axes of the rotor shaft and the gearbox input shaft, such that the longitudinal axis of the rotor shaft and the longitudinal axis of the gearbox input shaft are mounted eccentrically to each other in order to minimize any eccentricity or offset resulting from weight and/or loads and/or torque during operation,
wherein the elastic coupling comprises a sensor device to monitor a condition of the elastic coupling, wherein the sensor device is a rotational sensor device comprising rotational sensor targets and rotational sensor units, and wherein the first coupling part and the second coupling part of the elastic coupling each comprise a rotational sensor target being attached to a respective circumference of the first and second coupling part to determine a at least one of
a rotational speed of the rotor shaft and/or the gearbox;
a phase shift between the rotational position of the rotor shaft and the rotational position of the gearbox based on the output of the sensor; and
a load torque of the elastic elements.

2. The drive train according to claim 1, wherein the rotational sensor targets are of an optical type, a magnetic type and/or physically marked.

3. The drive train according to claim 2, wherein at least one rotational sensor target of the rotational sensor targets is physically marked and toothed.

4. The drive train according to claim 1, wherein rotational sensor units corresponding to the rotational sensor targets are arranged in a coupling housing.

5. The drive train according to claim 1, wherein the sensor device is an axial sensor device and/or a radial sensor device and/or tangential sensor device.

6. The drive train according to claim 1, wherein the elastic elements are configured such that the elastic elements have a first stiffness in a first load direction and a second stiffness in a second load direction, the first stiffness being greater than the second stiffness, and the elastic elements are arranged such that a main load torque direction coincides with the first load direction.

7. The drive train according to claim 1, wherein the elastic elements are pre-stressed in a non-loaded condition in order to increase a torsional stiffness.

8. The drive train according to claim 1, wherein the rotor shaft comprises a wind turbine main shaft.

9. A drive train for a wind turbine comprising:
a rotor shaft configured to be driven by a rotor about a main axis;
a support structure including a bearing housing surrounding at least one bearing and supporting the rotor shaft for rotation about the main axis, thereby constraining other movements of the rotor shaft;
a gearbox input shaft and a gearbox housing supporting the gearbox input shaft for rotation about the main axis while constraining other movements of the gearbox input shaft; and
an elastic coupling that couples the gearbox input shaft to the rotor shaft, the elastic coupling comprising a first coupling part rigidly connected with the rotor shaft, a second coupling part rigidly connected with the gearbox input shaft, and
elastic elements positioned between the first and the second coupling part, thereby constituting a single joint between the rotor shaft and the gearbox input shaft,
wherein each of the elastic elements includes a chamber configured to be filled with a fluid and at least some of the chambers are hydraulically connected with each other,
wherein the elastic coupling comprises a sensor device to monitor a condition of the elastic coupling, wherein the sensor device is a rotational sensor device comprising rotational sensor targets and rotational sensor units, and wherein the first coupling part and the second coupling part of the elastic coupling each comprise a rotational sensor target being attached to a respective circumference of the first and second coupling part to determine at least one of
a rotational speed of the rotor shaft and/or the gearbox;
a phase shift between the rotational position of the rotor shaft and the rotational position of the gearbox based on the output of the sensor; and
a load torque of the elastic elements.

* * * * *